June 9, 1925.
C. M. ANGELL
FEEDING TABLE
Original Filed Feb. 27, 1922
1,540,742
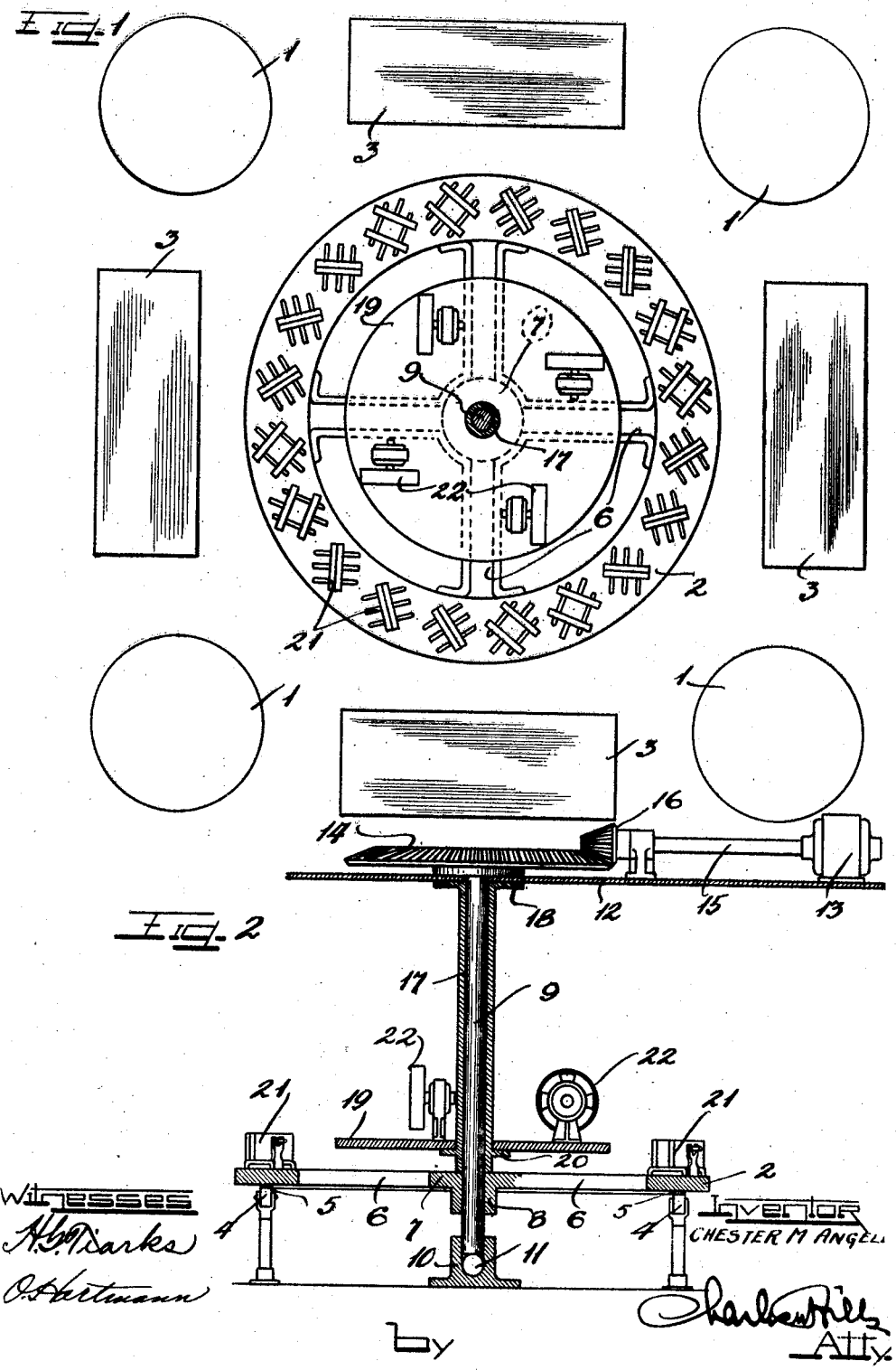

Patented June 9, 1925.

1,540,742

UNITED STATES PATENT OFFICE.

CHESTER M. ANGELL, OF CHICAGO, ILLINOIS, ASSIGNOR TO VESTA BATTERY CORPORATION, A CORPORATION OF ILLINOIS.

FEEDING TABLE.

Original application filed February 27, 1922, Serial No. 539,430. Divided and this application filed April 14, 1923. Serial No. 632,066.

*To all whom it may concern:*

Be it known that I, CHESTER M. ANGELL, a citizen of the United States, and a resident of the city of Chicago, in the county of Cook and State of Illinois, have invented certain new and useful Improvements in a Feeding Table; and I do hereby declare that the following is a full, clear, and exact description of the same, reference being had to the accompanying drawings, and to the numerals of reference marked thereon, which form a part of this specification.

This invention relates to conveyor tables designed to facilitate manufacturing operations such as the production of lead castings for battery plates and other purposes.

This application is a divisional of my co-pending application, Serial Number 539,430, filed February 27, 1922.

It is an object of this invention to provide an improved form of conveyor for continuously moving work to the workmen so that they will not be obliged to walk about from one point to another in order to obtain either tools or material.

A further object of the invention is to provide a conveyor which shall move the molds with very little power and which shall require a minimum of attention or repairs.

An additional object of the invention is to provide a stationary platform centrally located with respect to the conveyor table for the support of tools or instruments for aiding the operators in their work.

Other and further important objects of this invention will be apparent from the disclosures in the specifications and accompanying drawings.

On the drawings:

Figure 1 is a plan view of the arrangement of the conveyor and surrounding machinery.

Figure 2 is a central vertical section through the conveyor table.

As shown on the drawings:

The arrangement includes a number of furnaces 1 (in the drawing it is illustrated as four furnaces) arranged about a circular conveyor table 2. Between each pair of furnaces is placed a stationary table 3 to receive the castings or to serve as a work bench for finishing the castings if any hand work is needed to finish them.

The conveyor table 2 is mounted upon a series of anti-friction rollers 4. Preferably the table is made of wood and the portion contacting with the rollers 4 is reinforced by a strap or rail 5 of metal. In order that the table shall be as light as possible, the greater part thereof is made open and the outer part which carries the molds is in the form of an annular wooden ring connected to the center by a series of spokes 6 separated by open spaces.

The central portion 7 of the table is extended downwardly, as shown at 8, to constitute a hub.

Through this hub extends an upright shaft 9, the lower end of which is stepped in any suitable thrust bearing 10, preferably supplied with an anti-friction device 11. The shaft 9 is secured to the hub 8 by a key or other suitable device for insuring that the table will rotate with the shaft. The shaft extends upward above a support 12 which carries a motor 13.

The upper end of the shaft 9 is supplied with a large gear 14 which is driven from the motor 13 by a shaft 15 and a small gear 16. Although as illustrated but two gears are shown, and these are represented as bevel gears, it is obvious that any suitable reduction gearing may be used, whereby the table 2 is given a slow rotation from the motor 13.

The upper portion of the shaft 9 is surrounded by a sleeve 17 which is secured to the support 12 by a suitable flange 18 or in any other desired manner. The shaft 17 serves to support a platform 19 by means of a flange 20 or in any other desired way.

As shown, there are arranged on the conveyor table a series of molds 21. As the construction and operation of these molds forms no part of the present invention, and has, moreover, been fully described in my co-pending application, Serial No. 517,447, filed November 25, 1921, they need not be described here.

On the platform 19 may be arranged tools or instruments for aiding the operators in their work. As shown, a series of fans 22 are mounted on the platform for cooling the molds.

I am aware that numerous details of construction may be varied through a wide range without departing from the principles of this invention, and I therefore do not purpose limiting the patent granted otherwise than necessitated by the prior art.

I claim as my invention:

1. A circular conveyor table, a track upon the underside of said table, antifriction supporting devices contacting with said track, means for rotating said table and a circular stationary platform arranged above the conveyor table concentrically therewith.

2. A circular conveyor table, a track upon the underside of said table, anti-friction supporting devices contacting with said track, a vertical drive shaft central of the table, a stationary sleeve around said shaft, a platform above the table and secured to said sleeve, and driving means for said shaft above said sleeve.

3. A circular conveyor table, a vertical drive shaft central of the table, a stationary sleeve around said shaft, a platform above the table and secured to said sleeve and driving means for said shaft above said sleeve.

In testimony whereof I have hereunto subscribed my name in the presence of two subscribing witnesses.

CHESTER M. ANGELL.

Witnesses:
PAUL H. SEGNITZ,
EMANUEL ZULLO.